Figure 1:
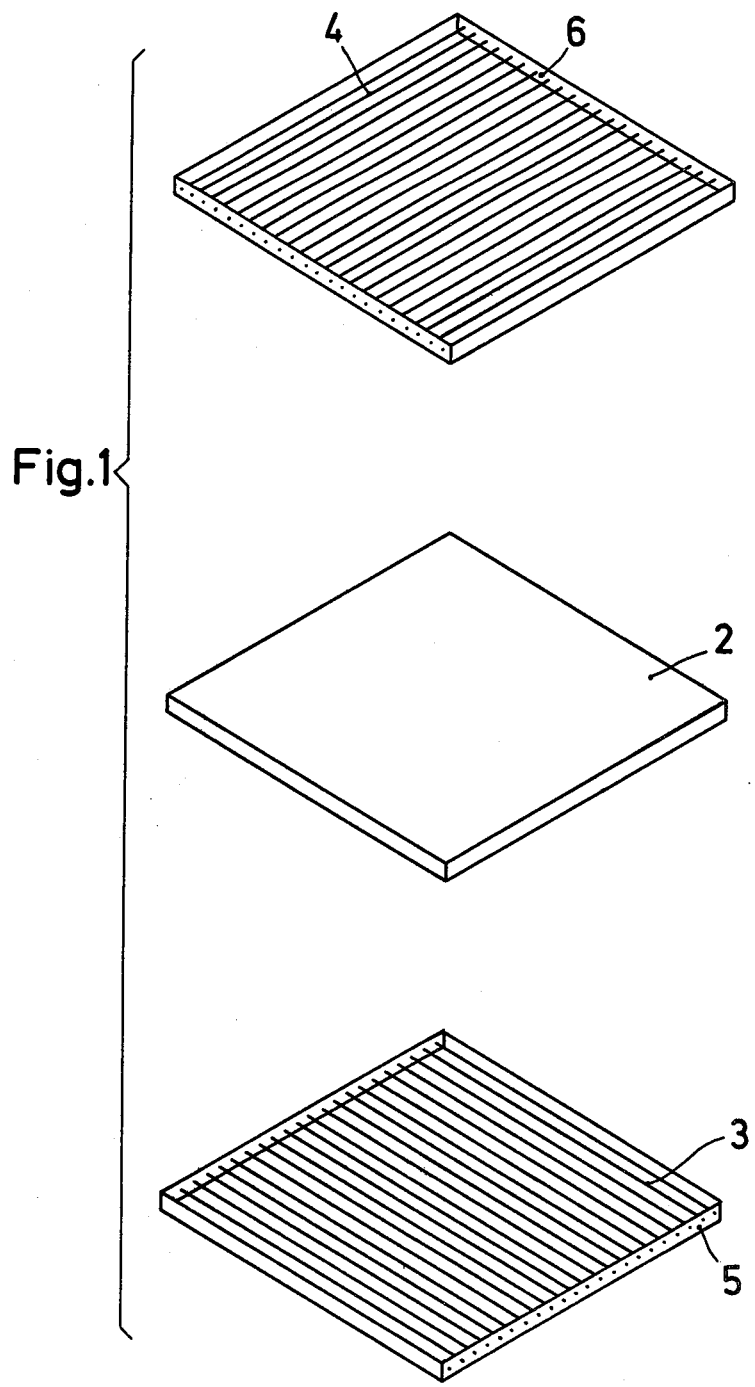

United States Patent [19]

Naumann

[11] 4,208,648
[45] Jun. 17, 1980

[54] SENSOR PANEL FOR LOCATING A LOAD

[75] Inventor: Karlheinz Naumann, Dittelbrunn, Fed. Rep. of Germany

[73] Assignee: Fichtel & Sachs AG, Schweinfurt, Fed. Rep. of Germany

[21] Appl. No.: 934,484

[22] Filed: Aug. 17, 1978

[30] Foreign Application Priority Data

Aug. 18, 1977 [DE] Fed. Rep. of Germany ....... 2737163

[51] Int. Cl.² ............................................ H01C 10/10
[52] U.S. Cl. ...................................... 338/99; 338/114
[58] Field of Search ................. 338/99, 100, 101, 114; 73/172, 432 R; 324/65 P

[56] References Cited

U.S. PATENT DOCUMENTS

| 3,509,256 | 4/1970 | Harshman et al. | 338/114 X |
| 3,836,900 | 9/1974 | Mansfield | 338/99 X |

Primary Examiner—C. L. Albritton
Attorney, Agent, or Firm—Toren, McGeady and Stanger

[57] ABSTRACT

A sensor panel for sensing the location and/or shape of a load superimposed on one face of the panel includes a plate consisting essentially of an electrically conductive material varying in electric conductivity in response to a pressure applied in the direction of plate thickness. Two groups of transversely spaced conductors elongated in respective common directions perpendicular to each other are secured to the two faces of the plate in electrically conductive contact.

7 Claims, 3 Drawing Figures

SENSOR PANEL FOR LOCATING A LOAD

The invention relates to the determination of the shape and/or location of an object, and more particularly to a sensor panel for sensing the object shape and/or location.

Automatic assembly machines and the like frequently need to grasp a workpiece by certain surfaces of the workpiece to permit access to other surfaces on which processing steps are to be preformed. The grasping tools must be controlled according to a sensed position of the workpiece unless special equipment is provided to present each workpiece to the grasping tools in a precisely defined position.

The object of the invention is the provision of a workpiece support capable of sensing the location and/or position of a load superimposed on a face of the support, and of furnishing a signal indicative of the sensed location and/or position.

With this object in view, the invention provides a sensor panel which includes a plate having two faces defining therebetween the thickness of the plate, each face having a width and length greater than the thickness. The plate consists essentially of an electrically conductive material varying in electric conductivity in response to pressure applied to the plate in the direction of its thickness. Two groups of conductors elongated in respective, angularly offset directions and spaced from each other transversely to the direction of elongation are secured to the two faces of the plate in electrically conductive contact so as to define a matrix of electrically conductive paths whose conductivities may be scanned automatically to provide an indication of the location, shape, or position of an object superimposed on one of the groups of conductors and thereby compressing the portions of the plate member between the two groups.

Figure 2:
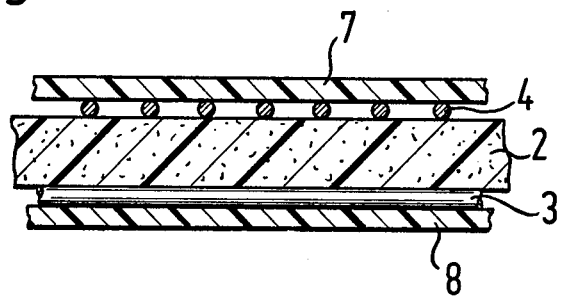
Figure 3:
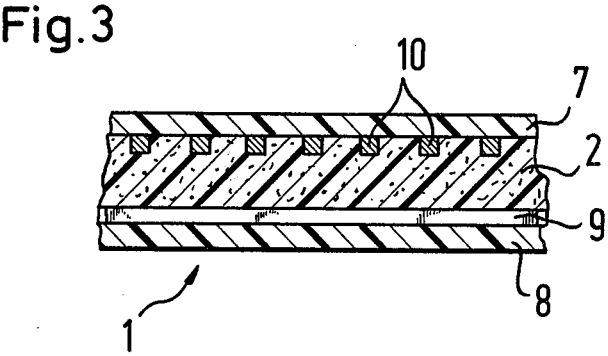

Other features, additional objects, and many of the attendant advantages of this invention will readily become apparent from the following detailed description of preferred embodiments when considered in connection with the appended drawing in which:

FIG. 1 is an exploded, perspective view of a first sensor panel of the invention; and FIGS. 2 and 3 show respective other sensor panels in elevational section.

Referring initially to FIG. 1, there is shown a square core plate 2 of a synthetic resin material which is electrically conductive to some extent and whose conductivity is increased by pressure in direction of the applied pressure. Several such resin compositions are commercially available, and a material found eminently suitable for the purposes of this invention is sold under the name DYNACON-C by Dynacon Industries Inc., Leonia, New Jersey. DYNACON-C is mainly consisting of silicone rubber and metallic compounds. However, this invention is not limited to the specific materials of construction.

Groups 3, 4 of transversely spaced, thin, parallel, copper or silver wires are held in tension in respective square frames 5, 6 of insulating material. The frames have each a length and width slightly greater than the corresponding major dimensions of the plate 2 so that the wires of each group may be superimposed on respective major faces of the plate 2 in electrically conductive contact in such a manner that the common direction of elongation of the wires in one group is perpendicular to the common direction of elongation of the wires in the other group.

A matrix of electrically conductive paths is thus defined by the intersections of the two groups of wires in a common plane of orthogonal projection and by the portions of the plate 2 between the intersecting parts of the wires. The electrical resistances of these paths may be scanned automatically by conventional mechanical or electronic switching gear. If the upper major face of the plate 2 is approximately horizontal, and if an object is placed on the wires superimposed on the upper face, the sensed resistances provide signals indicative of the weight distribution of the object and the panel and thus of its size, shape, and position, and such signals may be employed for controlling grasping tools of automatic machinery in a manner known and not in itself a part of this invention.

The exposed wires 3, 4 of the sensor panel illustrated in FIG. 1 cannot be used for sensing the shape and/or location of electrically conductive workpieces, and it is preferred to protect the conductors by insulating material against short circuits as is shown in FIGS. 2 and 3.

The sensor panel of the invention shown in FIG. 2 is provided with two layers 7, 8 of resilient, electrically insulating plastic which transmits the weight of an object deposited on the top face of the panel to the wires 4.

As is shown in FIG. 3, the conductors 9, 10 need not be of the circular cross section of the conventional wires shown in FIGS. 1 and 2, and they need not prevent direct area contact of the core plate 2 with the insulating layers 7, 8. In the embodiment of FIG. 3, square wires are embedded in the top and bottom faces of the core plate 2, and they may be embedded in the associated faces of the insulating layers 7, 8 in a manner obvious from the showing of FIG. 3 and in conductive contact with the core plate 2.

Square wires have been shown in FIG. 3 for the convenience of pictorial representation, but conductors of a thickness smaller than the conductor width and length, and too small to be shown on the scale of the appended drawing may be formed on one of the engaged faces of the core plate 2 or of the layers 7, 8 by the screen printing process conventional in the manufacture of printed circuits.

It is preferred that the conductivity of the material constituting the conductors 3, 4, 9, 10 be greater by at least one order of magnitude than that of the core panel 2 for increasing the sensitivity of the panel, and that the conductivities of the insulating layers 7, 8 be correspondingly smaller than that of the panel 2. With these limitations, materials other than those specifically referred above may be employed without impairing the advantages of the sensor panel of the invention.

A panel of the invention is most conveniently assembled with the use of conductors 3, 4, 9, 10 which consist of suitably conductive, synthetic resin composition, such as silicone rubber with matallic compounds.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A sensor panel for sensing a load superimposed on one face of said panel, the panel comprising:

(a) a plate member having two faces defining therebetween the thickness of said panel,
  (1) each of said faces having a width and length greater than said thickness,
  (2) said plate member consisting essentially of an electrically conductive material varying in electric conductivity in response to pressure applied to said plate member in the direction of said thickness;
(b) a first group of conductors elongated in a common first direction and transversely spaced from each other;
(c) a second group of conductors elongated in a common second direction and transversely spaced from each other,
  (1) said groups being respectively secured to said faces in electrically conductive contact,
  (2) said first a second directions being angularly offset from each other.

2. a panel as set forth in claim 1 further comprising a layer of a resilient, electrically insulating material superimposed on each of said groups.

3. A panel as set forth in claim 2, wherein said layers each have a face engaging the associated face of said plate member in area contact, said conductors of each group being recessed in at least one of the engaged faces of said plate member and of said layer.

4. A panel as set forth in claim 2, wherein said conductors are metallic.

5. A panel as set forth in claim 2, further comprising two frames, the conductors of said groups being secured in respective frames under longitudinal tension.

6. A panel as set forth in claim 2, wherein the conductors of at least one of said groups consist essentially of electrically conductive synthetic resin composition.

7. A panel as set forth in claim 1, wherein the conductors of each group are substantially parallel to each other and elongated at approximately right angles relative to the conductors of the other group.

* * * * *